(12) United States Patent
Cunanan

(10) Patent No.: US 7,377,958 B2
(45) Date of Patent: May 27, 2008

(54) APPARATUS AND METHOD FOR REMOVING AIRBORNE MOISTURE

(76) Inventor: Joaquin P. Cunanan, 2339 St. Croix St., Kissimmee, FL (US) 34741

( * ) Notice: Subject to any disclaimer, the term of this patent is extended or adjusted under 35 U.S.C. 154(b) by 521 days.

(21) Appl. No.: 11/059,976

(22) Filed: Feb. 17, 2005

(65) Prior Publication Data
US 2006/0180025 A1 Aug. 17, 2006

(51) Int. Cl.
*B01D 53/14* (2006.01)
*B01D 53/02* (2006.01)

(52) U.S. Cl. .............. 95/92; 95/117; 95/231; 96/108; 96/118; 96/243; 96/278

(58) Field of Classification Search ........... 95/231, 95/117–118, 92; 96/131–132, 139, 152, 96/108, 118, 243, 269, 278; 210/497.3, 477, 210/464, 482, 359, DIG. 6, 454
See application file for complete search history.

(56) References Cited

U.S. PATENT DOCUMENTS

| | | | | |
|---|---|---|---|---|
| 4,017,540 | A | * | 4/1977 | Kaugars et al. ............. 562/805 |
| 4,394,144 | A | * | 7/1983 | Aoki ........................ 96/119 |
| 4,497,712 | A | * | 2/1985 | Cowling .................... 210/691 |
| 5,148,613 | A | * | 9/1992 | Cullen ........................ 34/81 |
| 5,657,866 | A | | 8/1997 | Kaneko et al. |
| 5,907,908 | A | * | 6/1999 | Cunanan et al. ............. 34/61 |
| 6,767,521 | B1 | | 7/2004 | Vogt et al. |

FOREIGN PATENT DOCUMENTS

FR 2512688 * 3/1983

OTHER PUBLICATIONS http:///www.damprid.siwebbuilder.com/index.asp?cat=40019.
http://www.damprid.dsiwebbuilder.com/index.asp?cat=40058.
http://www.dampcheck.com/.
http://dampcheck.com/contain.htm.
http://dampcheck.com/dome.htm.
http://www.drytheair.com/xcart/store/catalog/category_252_DriZAir_Products_DriZAir_Units_page_1.html.
http://www.drytheair.com/xcart/store/catalog/product_16133_DriZAir_Unit_with_1_Package_of_13_oz_Crystals.html.
http://www.drytheair.com/xcart/store/catalog/product_16134_DriZAir_Decorator_Unit_w_Tray.html.

* cited by examiner

*Primary Examiner*—Duane Smith
*Assistant Examiner*—Ives Wu
(74) *Attorney, Agent, or Firm*—Lea H. Speed; Peter L. Brewer; Baker, Donelson, Bearman, Caldwell & Berkowitz, PC

(57) ABSTRACT

An apparatus is provided for removing airborne moisture from a designated area. In one embodiment, the apparatus includes a bucket, a liquid absorption medium (such as ground corn cobs) placed in the bottom of the bucket to form a media bed, a tray placed over the absorption media bed, and a moisture absorption medium (such as calcium chloride) placed in the bucket over the tray. A method is also provided for absorbing moisture from a humid environment using the apparatus. When the apparatus is exposed to humid conditions, the $CaCl_2$ will absorb moisture and become hardened. As the $CaCl_2$ media hardens, it will expand. However, its lateral expansion is restricted by a side wall of the tray. Over further time, the $CaCl_2$ will begin to dissolve into a brine. The brine will gravitationally seep through the through-openings in the tray and be captured by the corn cob medium.

26 Claims, 2 Drawing Sheets

APPARATUS AND METHOD FOR REMOVING AIRBORNE MOISTURE

BACKGROUND OF THE INVENTION

1. Field of the Invention

The present invention relates to the absorption of moisture. More specifically, the invention relates to an apparatus and method for removing airborne moisture from a designated area.

2. Description of the Related Art

Many areas of the United States experience periods of heavy rainfall or periods of high humidity. Such conditions may create a condition of high airborne moisture in indoor environments, particularly in environments that are not air conditioned. High humidity levels in such an area can cause mold spores to be generated. Mold can cause a deterioration of contents in the structure or even the structure itself. Of even greater concern, the presence of mold spores may cause health problems to individuals that remain in the area for any length of time. At the least, high humidity levels can create a stale and musty odor that is unpleasant.

In order to remove moisture from an indoor environment, it is known to employ a motorized de-humidifier. However, such de-humidifiers are expensive to purchase and heavy to move. In addition, de-humidifiers require electricity and create noise when running. A less expensive and less intrusive way to remove moisture is provided by DampRid, Inc., which operates under the trade name DampRid®. Operating out of Orlando, Fla., DampRid® provides an approximately four to five quart bucket that contains calcium chloride crystals. The $CaCl_2$ crystals have deliquescent qualities, enabling an individual to place a bucket of the crystals in an area of high humidity for moisture absorption. Depending upon the ambient conditions, the crystals may be activated for up to six months. Moreover, the DampRid® product may be readily located in a boat, a garage, a camper, a basement, a second home or other area prone to humid conditions.

In operation, the $CaCl_2$ crystals will harden as they absorb moisture. As the reaction continues, the crystals will begin to dissolve, slowly forming a brine soup. When the crystals of the DampRid® product have completely dissolved, the product can be discarded without harm to the environment. The DampRid® product thus helps to eliminate excess moisture in the air, helps to prevent stains and damage caused by mold and mildew, and helps to eliminate odors caused by mold and mildew forming from airborne moisture.

In order to improve the efficiency of the $CaCl_2$/moisture reaction, it is desirable to wick away the dissolved brine as it forms. Therefore, a need exists for an apparatus that enables the dissolved and liquefied portion of a moisture absorbing material to be wicked away during the absorption reaction. Further, there is a need for a method for absorbing moisture that employs such an apparatus.

SUMMARY OF THE INVENTION

An apparatus is provided for removing airborne moisture from a designated area. In one embodiment, the apparatus comprises a container; a liquid absorption media placed in the bottom of the bucket to form a media bed; a tray placed over the absorption media bed, the tray having a plurality of through-openings and being sized to move along a vertical axis of the container; and a moisture absorption media placed over the tray. Preferably, the liquid absorption media comprises ground corn cobs, while the moisture absorption media comprises calcium chloride crystals. Preferably, the container is a bucket with a handle The tray in one aspect defines a base and a circular side wall. The tray may further have a circular interior opening. In one embodiment, the apparatus further comprises a vertical drainage member that is received within the interior opening. The vertical drainage member will also have a plurality of through-openings to aid in moving dissolved calcium chloride crystals downward into the ground corn cobs. In one aspect, the vertical drainage member is integral to the tray, though it is preferred that it be a separate component.

In operation, the bucket containing the two absorption media is placed in a contained humid environment. Such an environment may be a boat, a basement, a storage facility, a car or other location that is subject to high ambient humidity. Over time, the moisture absorption medium, e.g., the $CaCl_2$ crystals, will absorb moisture and become hardened. As the crystals harden into a block of material, they also expand. However, in the present apparatus lateral expansion of the crystals is now restricted by a surrounding side wall of the tray. Over further time, the $CaCl_2$ medium will incrementally dissolve into a brine. The brine will gravitationally seep through the through-openings in the tray and be captured by the liquid absorption media, e.g., ground corn cobs.

A method for removing airborne moisture is also provided. In one embodiment, the method includes the steps of providing a container; placing a liquid absorption media in the container to form a media bed; placing a tray over the media bed, the tray having a plurality of through-openings, and the tray being sized to move along an axis of the container; and placing a moisture absorption media over the tray. Preferably, the liquid absorption media again comprises ground corn cobs, while the moisture absorption media comprises calcium chloride crystals.

In one aspect, the tray includes a base, a circular side wall and an interior opening. The interior opening is sized to receive a vertical drainage member such as a cone.

In operation, the container is placed in an area of humid conditions. The container is left for a period of time to allow the $CaCl_2$ to absorb ambient moisture. Over time, the $CaCl_2$ will absorb moisture and become hardened. As the $CaCl_2$ hardens, it also expands. However, its lateral expansion is restricted by the surrounding side wall of the tray. Over further time, the $CaCl_2$ crystals will begin to dissolve into a brine. The brine will gravitationally seep through the through-openings in the tray and the vertical drainage member and be absorbed by the ground corn cobs. The corn cob medium will expand, causing the tray to be raised relative to the container. The outer diameter of the tray facilitates vertical movement of the tray within the container to accommodate the swelling of the corn cob medium.

BRIEF DESCRIPTION OF THE DRAWINGS

So that the manner in which the above recited features of the present invention can be better understood, certain drawings are appended hereto. It is to be noted, however, that the appended drawings illustrate only selected embodiments of the inventions and are therefore not to be considered limiting of its scope, for the inventions may admit to other equally effective embodiments and applications.

DETAILED DESCRIPTION

Definitions

As used herein, the term "container" refers to any container for holding the first and moisture absorption media. It may be fabricated from any water-impermeable material.

The term "tray" means any body having an open upper surface for receiving a volume of absorption media. It too may be fabricated from any material. The tray may be substantially flat as like a disk, or may have side walls.

The term "moisture absorption media" refers to any solid material or mixture that has hygroscopic properties.

Description of Specific Embodiments

Figure 1:
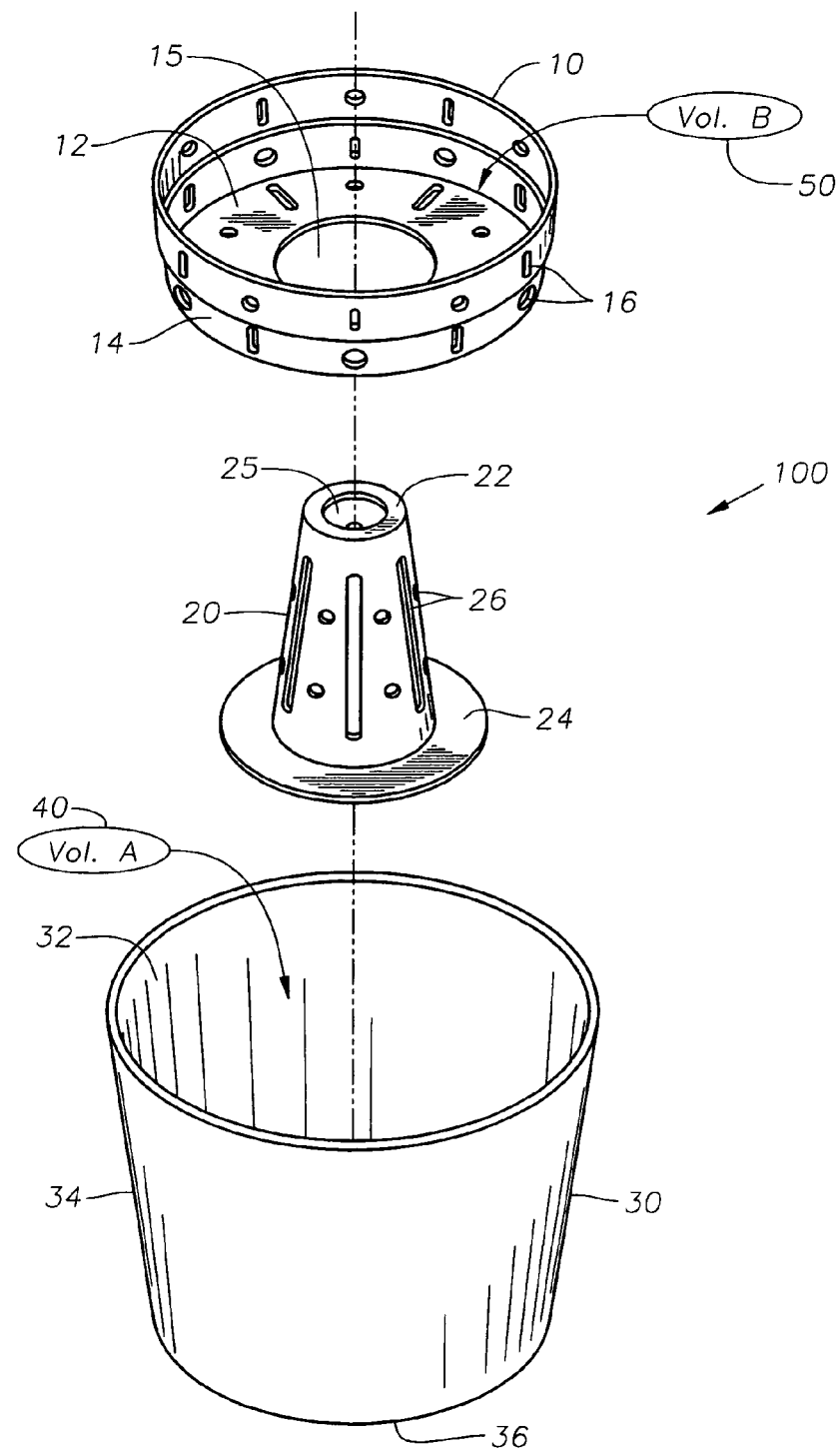
FIG. 1 presents a perspective view of the moisture absorption apparatus of the present invention, in one embodiment. The various components of the apparatus are exploded apart for illustration.

FIG. 1 presents a perspective view of the moisture absorption apparatus 100 of the present invention, in one embodiment. The various components of the apparatus 100 are exploded apart for illustration.

The apparatus 100 first comprises a tray 10. The tray 10 has a base 12, a surrounding side wall 14 and an upper opening for receiving a dry material. The base 12 and, optionally, the side wall 14 has a plurality of through-openings 16. The through-openings 16 serve as a means for dissolved material to gravitationally flow out of the tray 10. The through-openings 16 may be of any configuration. The exemplary tray 10 of FIG. 1 shows through-openings 16 in several different profiles, including slits, circles and ovals. In addition, the exemplary tray 10 has a circular side wall 14. The tray is preferably fabricated from a light polyethylene product, though it may also define a cellulosic substrate.

In the embodiment of FIG. 1, the tray 10 also includes a central opening 15. The central opening 15 is sized to receive a longitudinal drainage member. The longitudinal drainage member is seen in FIG. 1 at 20, and is configured as a frusto-conical member, or "cone." However, other shapes such as a straight cylindrical body may be employed. The drainage member 20 also includes a plurality of through-openings 26. These through-openings 26 permit dissolved material to gravitationally flow through the drainage member 20, as will be described in fuller detail below. The through-openings 26 may again be of any configuration. The exemplary drainage member 20 of FIG. 1 shows through-openings 26 in two different profiles, to wit, slits and circles.

The drainage member 20 preferably is arranged as a vertical drainage member. The illustrative drainage member 20 has a top 22 and a bottom 24. A central opening 25 may optionally be provided which extends through the drainage member 20 vertically. The height of the drainage member 20 is preferably slightly taller than the height of the side walls 14 of the tray 10.

The apparatus 100 next includes a container 30. The container 30 may be of any shape or material. Preferably, the container 30 defines a bucket having a handle and a lid. The bucket 30 has a base 36 and a side wall 34 that together form an interior volume 32. In one aspect, the bucket 30 is approximately seven inches in height and approximately nine inches in diameter at the top. Of course, these are mere illustrative dimensions; other dimensions may be used. In one aspect, the bucket 30 is fabricated from a soft plastic material such as high density polyethylene.

The apparatus next includes two absorption media. First, a liquid absorption meduim is shown schematically in FIG. 1 as "Vol. A," and is identified at 40. This liquid absorption medium 40 is placed in the bottom 36 of the container 30 to form an absorption media bed. The media bed 40 receives the longitudinal drainage member 20 and the tray 10. It is preferred that the liquid absorption medium 40 be ground corn cobs. In one aspect, the bucket 30 receives approximately 40 ounces of the corn cob material in the bottom 36. Corn cob material is preferred as it is inexpensive, environmentally safe, all natural, renewable and highly effective as an absorbent. Indeed, in some arrangements ground corn cob material can absorb up to four times its own weight. However, the liquid absorption medium may be other materials including a gel forming polymer. Examples of a gel forming polymer include but are not limited to, polyacrylates, polyacrylimide-polyacrylate co-polymers and polyacrylate-polyalcohol co-polymers. Alternatively, the liquid absorption media may include cotton materials, wood-pulp materials and vermiculite materials.

Second, the moisture absorption medium is shown schematically in FIG. 1 as "Vol. B," and is identified at 50. This absorption medium 50 is placed in the tray 10 and, optionally, over the longitudinal drainage member 20. The moisture absorption medium 50 defines a solid material that is hygroscopic, that is, it has an affinity for airborne vapor. The moisture absorption medium 50 is preferably calcium chloride. However, other absorption media may be used. Examples of suitable absorption media include salts selected from the group consisting of alkali metal halides, alkaline earth metal halides, iron halides and aluminum halides, individually or combinations thereof. Alternatively, the hygroscopic deliquescent is a gel. In still another alternative embodiment, the hygroscopic deliquescent comprises magnesium chloride. The moisture-absorbent material can also comprise a combination of a hygroscopic deliquescent and a gel forming polymer. The gel forming polymer can be selected from but is not limited to, polyacrylates, polyacrylimide-polyacrylate co-polymers and polyacrylate-polyalcohol co-polymers. Alternatively still, the moisture absorption media 50 may include potassium chloride, molecular sieve, clay, silica-based materials and volcanic materials.

When the absorbent medium 50, e.g., calcium chloride ($CaCl_2$), traps airborne vapor, it temporarily forms a solid block. As the solid block is formed, the material expands in volume. By placing the $CaCl_2$ (or other media) 50 in the tray 10, the area of expansion is restricted. Stated another way, the volume of lateral expansion is limited by the surrounding wall 14. As the medium 50 continues to absorb moisture, and over time, the medium 50 will begin to dissolve. A chemical reaction takes place where a brine is formed. The dissolving medium enters a liquid phase and is extruded through the through-openings 16, 26. Heat is generated when calcium chloride and water are mixed, but little or no heat or fumes are emitted.

In operation, the liquid absorption medium 40 is placed into the container 30. The longitudinal drainage member 20 (if used) is next placed into the container 30 on or into the liquid absorption medium 40. The tray 10 is then placed over the longitudinal drainage member 20 such that the central opening 15 receives the drainage member 20. Thereafter, the moisture absorption medium 50 is placed into the tray 10.

The apparatus 100 is then ready to be placed into a humid environment for dehumidification.

It is noted that a cellulosic or polyethylene covering (not shown) may be placed over the top of the container 30 once the apparatus 100 is assembled. The covering defines a semi-permeable membrane. Preferably, the covering is fabricated from polyethylene, commonly sold under the trade name TYVEK®. Alternatively, a polytetrafluoroethylene material such as GORTEX® may be used. The covering serves to maintain the materials in the volume 36 and to prevent human contact with the moisture absorbing substance 50 while at the same time allowing the moisture-absorptive media 50 to absorb moisture from the air.

Figure 2:
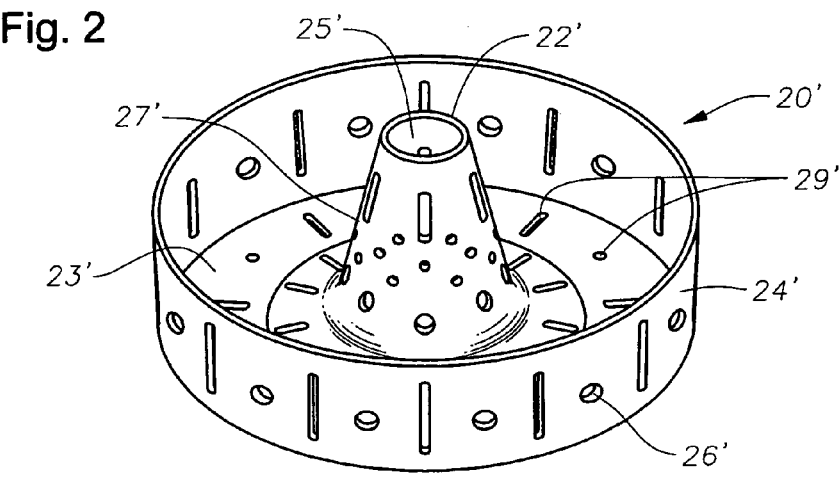
FIG. 2 is a perspective view of a tray of the apparatus, in an alternate embodiment.

It is also again noted that the use of a separate longitudinal drainage member 20 is optional. In one aspect, the tray 10 has no central opening 15 and receives no drainage member 20. In another aspect though, the longitudinal drainage member is integral with the tray 10. FIG. 2 shows a perspective view of a tray 20' of the apparatus 100, in an alternate embodiment. Here, the tray 20' includes a base 23', a side wall 24', a plurality of through-openings 26' and an integral longitudinal drainage member 27'. A central opening 25' is optionally preserved in even this embodiment 20'.

A method for removing airborne moisture is also provided herein. In operation, the apparatus 100 is placed into an area of high humidity. As the moisture absorption medium 50 begins to absorb vapor, it becomes a hardened block. The dimensions of the tray 10, 20' serve to restriction expansion. After a further period of time, the liquid absorption medium 50 begins to dissolve. Liquid is gravitationally extruded through the through-openings 16, 26, or 26'. This moisture is then quickly and effectively wicked away or absorbed by the liquid absorption medium 40.

Figure 3A:
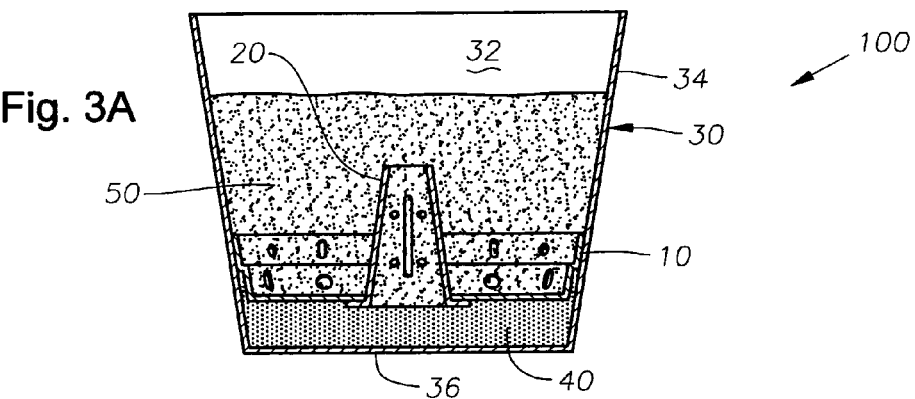
FIG. 3A provides a cross-sectional view of the apparatus of FIG. 1, in its initial, pre-reaction stage.

FIG. 3A provides a cross-sectional view of the apparatus 100 of FIG. 1, in its initial, pre-reaction stage. Here, it can be seen that the liquid absorption medium 40 is in the bottom 36 of the container 30. The moisture absorption medium 50 is over the tray 10. In this particular illustration, the moisture absorption medium 40 has been filled even over the longitudinal drainage member 20 so that the absorption medium 40 has fallen into the central opening 25. The first 40 and second 50 absorption media are in partial contact. This is permissible as there is no known chemical reaction between corn cob and calcium chloride.

Figure 3B:
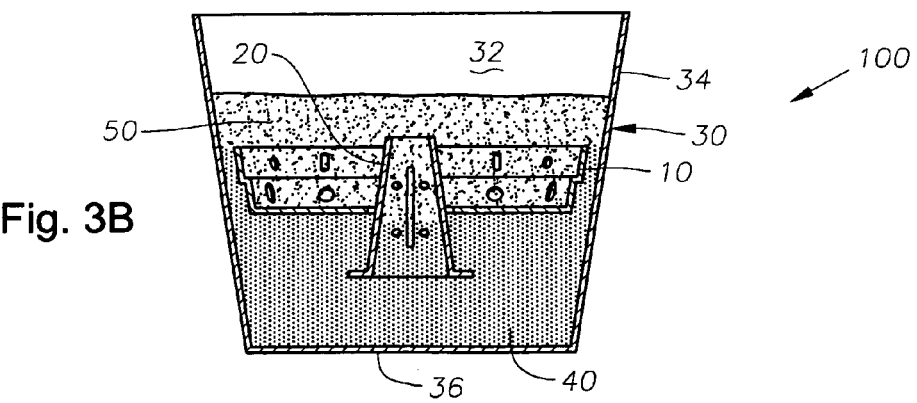
FIG. 3B shows the apparatus of FIG. 3A after a period of time during which the moisture reaction process has taken place.

FIG. 3B shows the apparatus 100 of FIG. 3A after a period of time during which the moisture reaction process has taken place. It can be seen that the liquid absorption medium 40 has begun to swell. Indeed, this material 40 has begun displacing the tray 10 and the longitudinal drainage member 20 upward relative to the container 30. The volume 32 within the container 30 is being filled. Some separation of the tray 10 and the longitudinal drainage member 20 may occur, and is acceptable.

Therefore, an apparatus has been provided herein for absorbing airborne moisture. A method for absorbing airborne moisture has further been disclosed. It is understood that the inventions herein have been disclosed in the context of particular drawings and specific embodiments. However, the scope of the claims, which follow, should not be construed as limited to those specific embodiments.

I claim:

1. An apparatus for removing airborne moisture from a designated area, comprising:
    a container;
    a liquid absorption media placed in the container to form an absorption media bed;
    a tray placed over the absorption media bed, the tray having a plurality of through-openings, and being sized to move along a vertical axis of the container in response to swelling of the liquid absorption media; and
    a moisture absorption media placed over the tray.

2. The apparatus of claim 1, wherein the container is a bucket.

3. The apparatus of claim 2, wherein the container further comprises a removable lid and a handle.

4. The apparatus of claim 1, wherein the liquid absorption media comprises ground corn cobs.

5. The apparatus of claim 1, wherein the moisture absorption media comprises calcium chloride.

6. The apparatus of claim 1, wherein the tray comprises:
    a base; and
    a circular side wall.

7. The apparatus of claim 6, wherein the tray further comprises:
    an interior opening.

8. The apparatus of claim 7, further comprising:
    a longitudinal drainage member sized to slidingly receive the interior opening of the tray.

9. The apparatus of claim 6, wherein the tray further comprises:
    an interior vertical drainage member integral to the tray.

10. A method for removing airborne moisture, comprising the steps of:
    providing a container;
    placing a liquid absorption media in the container to form a media bed;
    placing a tray over the absorption media bed, the tray having a plurality of through-openings, and the tray being sized to move along a vertical axis of the container in response to swelling of the liquid absorption media; and
    placing a moisture absorption media over the tray.

11. The method of claim 10, wherein the container is a bucket comprising:
    a removable lid; and
    a handle.

12. The method of claim 10, wherein the liquid absorption media comprises ground corn cobs.

13. The method of claim 10, wherein the moisture absorption media comprises calcium chloride.

14. The method of claim 10, wherein the tray comprises:
    a base; and
    a circular side wall.

15. The method of claim 14, wherein the tray further comprises:
    an interior opening.

16. The method of claim 15, further comprising the step of:
    providing a longitudinal drainage member sized to slidingly receive the interior opening of the tray along the axis of the container.

17. The method of claim 14, wherein the tray further comprises:
    an interior vertical drainage member integral to the tray.

18. The method of claim 10, further comprising the step of:
    placing the container in an area of humid conditions; and
    leaving the container for a period of time to allow the moisture absorption media to absorb moisture.

19. A method for removing airborne moisture, comprising the steps of:
    providing a container having a vertical axis;

placing a liquid absorption media comprising ground corn cobs in a bottom of the container to form an absorption media bed;

placing a vertical drainage member on the absorption media bed, the vertical drainage member having a plurality of through-openings;

placing a tray over the absorption media bed, the tray also having a plurality of through-openings and having a central opening for receiving the vertical drainage member, with the central opening being sized to slidably move up the vertical drainage member in response to swelling by the ground corn cobs;

placing a moisture absorption media comprised of calcium chloride crystals in the tray.

20. The method of claim 19, wherein the container is a bucket comprising:

a removable lid; and a handle.

21. The method of claim 20, wherein the container further comprises:

a semi-permeable covering.

22. The method of claim 19, wherein the tray comprises:

a base; and a circular side wall.

23. An apparatus for removing airborne moisture from a designated area, comprising:

a bucket having a vertical axis;

a bed of ground corn cobs in a bottom of the container;

a vertical drainage member on at least a portion of the ground corn cobs, the vertical drainage member having a plurality of through-openings;

a tray placed over the bed of ground corn cobs, the tray having a plurality of through-openings, and having a central opening for receiving the vertical drainage member, with the central opening being sized to slidably move up the vertical drainage member when the ground corn cobs swell; and a bed of calcium chloride crystals placed into the tray.

24. The apparatus of claim 23, wherein the tray comprises:

a base; and a circular side wall.

25. The apparatus of claim 23, wherein the tray defines a substantially flat body fabricated from a cellulosic material.

26. The apparatus of claim 23, wherein the container further comprises:

a semi-permeable covering.

* * * * *